(12) United States Patent
Pippins

(10) Patent No.: US 11,140,885 B2
(45) Date of Patent: Oct. 12, 2021

(54) UNIVERSAL BRACKET ATTACHMENT SYSTEM AND METHOD OF USE

(71) Applicant: Joseph M. Pippins, Olathe, KS (US)

(72) Inventor: Joseph M. Pippins, Olathe, KS (US)

( * ) Notice: Subject to any disclaimer, the term of this patent is extended or adjusted under 35 U.S.C. 154(b) by 413 days.

(21) Appl. No.: 16/189,266

(22) Filed: Nov. 13, 2018

(65) Prior Publication Data

US 2019/0075773 A1 Mar. 14, 2019

Related U.S. Application Data

(63) Continuation of application No. 15/582,259, filed on Apr. 28, 2017, now Pat. No. 10,130,089, which is a
(Continued)

(51) Int. Cl.
| | | |
|---|---|---|
| *A01K 97/10* | (2006.01) | |
| *A01K 97/12* | (2006.01) | |
| *A01K 99/00* | (2006.01) | |
| *A01K 97/06* | (2006.01) | |
| *A01K 97/20* | (2006.01) | |
| *F21V 33/00* | (2006.01) | |
| *F21L 4/08* | (2006.01) | |
| *F21V 23/06* | (2006.01) | |

(Continued)

(52) U.S. Cl.
CPC .......... *A01K 97/125* (2013.01); *A01K 97/00* (2013.01); *A01K 97/04* (2013.01); *A01K 97/06* (2013.01); *A01K 97/10* (2013.01); *A01K 97/20* (2013.01); *A01K 97/22* (2013.01); *A01K 99/00* (2013.01); *F21L 4/08* (2013.01); *F21V 23/0471* (2013.01); *F21V 23/06* (2013.01); *F21V 33/008* (2013.01); *F21Y 2115/10* (2016.08); *Y02A 40/80* (2018.01)

(58) Field of Classification Search
CPC ........ A01K 97/00; A01K 97/04; A01K 97/05; A01K 97/06; A01K 97/08; A01K 97/10; A01K 97/11; A01K 97/20; A01K 97/22; A01K 99/00
USPC .......................... 43/16–17, 21.2, 54.1, 55–57
See application file for complete search history.

(56) References Cited

U.S. PATENT DOCUMENTS

| 2,493,084 A | 1/1950 | Pharo |
|---|---|---|
| 3,051,422 A | 8/1962 | Crump et al. |

(Continued)

FOREIGN PATENT DOCUMENTS

| EP | 1816262 | 2/2006 |
|---|---|---|
| EP | 2387875 | 5/2010 |

*Primary Examiner* — David J Parsley
*Assistant Examiner* — Danielle A Clerkley
(74) *Attorney, Agent, or Firm* — Law Office of Mark Brown, LLC; Christopher M. DeBacker

(57) ABSTRACT

A fishing caddy system which generally includes a rod holder assembly having at least one rod holder which may be rotatable to different angles to suit the user. There are hooks in the rod holder assembly for receiving the fishing line and thereby preventing the wind from blowing the line around, resulting in faster detection of catches. The rod holder assembly can be mounted to a universal mounting receiver which can be placed on any stationary body. Cup holders and other accessories may also be mounted in proximity to the rod holder assembly using other universal mounting receivers. An accelerometer may also be included which detects vibrations caused by the fishing line against the hook, alerting the user via LEDs or a wireless alert sent to the user's wireless computing device, such as a smart phone.

4 Claims, 7 Drawing Sheets

Related U.S. Application Data continuation-in-part of application No. 14/808,931, filed on Jul. 24, 2015, now abandoned.

(60) Provisional application No. 62/028,626, filed on Jul. 24, 2014, provisional application No. 62/065,549, filed on Oct. 17, 2014.

(51) Int. Cl.
| | |
|---|---|
| *F21V 23/04* | (2006.01) |
| *A01K 97/04* | (2006.01) |
| *A01K 97/00* | (2006.01) |
| *A01K 97/22* | (2006.01) |
| *F21Y 115/10* | (2016.01) |

(56) References Cited

U.S. PATENT DOCUMENTS

| | | |
|---|---|---|
| 3,378,134 A | 4/1968 | Wilkinson et al. |
| 3,546,805 A | 12/1970 | Schaeffer |
| 3,603,019 A | 9/1971 | Smeltzer |
| 3,667,708 A | 6/1972 | Smeltzer |
| 3,938,132 A | 2/1976 | Cunningham |
| 4,428,617 A | 1/1984 | Lawson |
| 4,697,379 A | 10/1987 | McPhaul |
| 4,845,881 A | 7/1989 | Ward |
| 5,125,183 A | 6/1992 | Tisdell |
| 5,131,179 A | 7/1992 | McEwen |
| 5,249,388 A | 10/1993 | Crabtree |
| 5,251,777 A | 10/1993 | McMahon |
| 5,333,408 A | 8/1994 | Simmons |
| 5,419,154 A | 5/1995 | Christoff |
| 5,471,779 A | 12/1995 | Downey |
| 5,562,779 A | 10/1996 | Allaway et al. |
| 5,755,057 A | 5/1998 | Dancer |
| 5,797,528 A | 8/1998 | McDuffie |
| 5,902,414 A | 5/1999 | Keal et al. |
| 6,052,939 A | 4/2000 | McClain |
| 6,189,258 B1 | 2/2001 | Anderson |
| 6,408,561 B1 | 6/2002 | Winter |
| 6,820,364 B1 | 11/2004 | Tyson |
| 7,055,983 B1 | 6/2006 | Baker et al. |
| 7,140,507 B2 | 11/2006 | Maldonado et al. |
| 7,389,608 B1 | 6/2008 | Mackay |
| 7,562,488 B1 | 7/2009 | Perkins |
| 7,650,713 B1 | 1/2010 | Peede |
| 8,052,020 B1 | 11/2011 | Wurtz |
| 8,118,111 B2 | 2/2012 | Armas |
| 8,925,752 B2 | 1/2015 | Smith |
| 9,308,557 B2 | 4/2016 | Nicholls et al. |
| 2003/0173390 A1 | 9/2003 | Smith |
| 2004/0058096 A1 | 3/2004 | Prevost |
| 2004/0086664 A1 | 5/2004 | Seaton |
| 2005/0252071 A1 | 11/2005 | Urban |
| 2008/0082241 A1 | 4/2008 | Meiners et al. |
| 2008/0141516 A1 | 6/2008 | Julicher et al. |
| 2008/0145574 A1 | 6/2008 | Julicher et al. |
| 2008/0159079 A1 | 7/2008 | Dir et al. |
| 2008/0185493 A1 | 8/2008 | Wakefield et al. |
| 2009/0183886 A1 | 7/2009 | Armas |
| 2010/0001115 A1 | 1/2010 | Jonsson |
| 2010/0313464 A1 | 12/2010 | Bain |
| 2010/0319510 A1 | 12/2010 | Bearden |
| 2011/0071803 A1 | 3/2011 | Meiners et al. |
| 2011/0081506 A1 | 4/2011 | Lee |
| 2012/0006930 A1 | 1/2012 | Mitchell |
| 2013/0013266 A1 | 1/2013 | Meiners et al. |
| 2013/0243976 A1 | 9/2013 | Lee |
| 2013/0268330 A1 | 10/2013 | Carr |
| 2015/0377549 A1 | 12/2015 | Cai |
| 2016/0138227 A1 | 5/2016 | Craven |
| 2017/0175343 A1 | 6/2017 | Des Garennes et al. |
| 2017/0328017 A1 | 11/2017 | Craven |

UNIVERSAL BRACKET ATTACHMENT SYSTEM AND METHOD OF USE

CROSS-REFERENCE TO RELATED APPLICATIONS

This application is a continuation of and claims priority in U.S. patent application Ser. No. 15/582,259 filed Apr. 28, 2017, which claims priority in U.S. Provisional Patent Application No. 62/421,818, filed on Nov. 14, 2016, and which was also a continuation-in-part of and claims priority in U.S. patent application Ser. No. 14/808,931, filed Jul. 24, 2015, which claims priority in U.S. Provisional Patent Application No. 62/028,626, filed on Jul. 24, 2014, and also claims priority in U.S. Provisional Patent Application No. 62/065,549, filed Oct. 17, 2014, all of which are incorporated herein by reference.

BACKGROUND OF THE INVENTION

1. Field of the Invention

The present invention relates generally to a fishing caddy, and particularly to a unique caddy with adjustable features for accommodating various species and fishing environments.

2. Description of the Related Art

Currently a person going fishing has to pack a number of items, including a folding chair, hooks, rods, rod holders, and flashlights or head lamps. The fisherman would have to carry all of this gear to and from the fishing site, as well as set the gear up on the site once they have reached the site.

Existing rod holders require the holders to be driven into the solid earth, resulting in rods being placed too far from the water and resulting in missed bites. These holders are also non-adjustable and cannot be placed in locations without soil present. Existing rod holders are further subject to missed catches on windy days when it is difficult to tell when a catch is on the line.

Head lamps and flashlights are added costs which can scare fish away when shone directly into the water. Light is necessary when fishing early in the morning, but can be detrimental if the fish are scared away from the source.

Heretofore there has not been available a fishing caddy system and method with the advantages and features of the disclosed subject matter.

SUMMARY OF THE INVENTION

A fully-integrated fishing caddy system which generally includes a five gallon bucket as a base and a padded lid enclosing the interior of the bucket, the padded lid further serving as a seat for the user. The bucket includes at least one rod holder which can be rotated to different angles to suit the user. There are hooks in the bucket for receiving the fishing line and thereby preventing the wind from blowing the line around, resulting in faster detection of catches. Other features include the ability to place caught fish into the bucket via a chute, cup holders, and drainage spouts.

An alternative embodiment includes a rod holder unit which can be attached to an existing five gallon bucket or the like. The rod holder unit could be screwed into the bucket, using a backing plate placed within the bucket to receive the screws, or the rod holder could be punched through the wall of the bucket with spikes or screws, allowing a quick attachment to the bucket.

BRIEF DESCRIPTION OF THE DRAWINGS

The drawings constitute a part of this specification and include exemplary embodiments of the invention illustrating various objects and features thereof, wherein like references are generally numbered alike in the several views.

DETAILED DESCRIPTION OF THE PREFERRED EMBODIMENT

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The present invention is a fishing caddy system with various features and functions for accommodating different fishing conditions, target species and environments. For example and without limitation, the following description provides information concerning embodiments of the invention, which can be adapted and changed as necessary.

Additional examples include computing devices such as a mobile smart device including a display device for viewing a typical web browser or user interface will be commonly referred to throughout the following description. The type of device, computer, display, or user interface may vary when practicing an embodiment of the present invention. A computing device could be represented by a desktop personal computer, a laptop computer, "smart" mobile phones, PDAs, tablets, or other handheld computing devices.

II. Preferred Embodiment Fishing Caddy System 2

Figure 1:
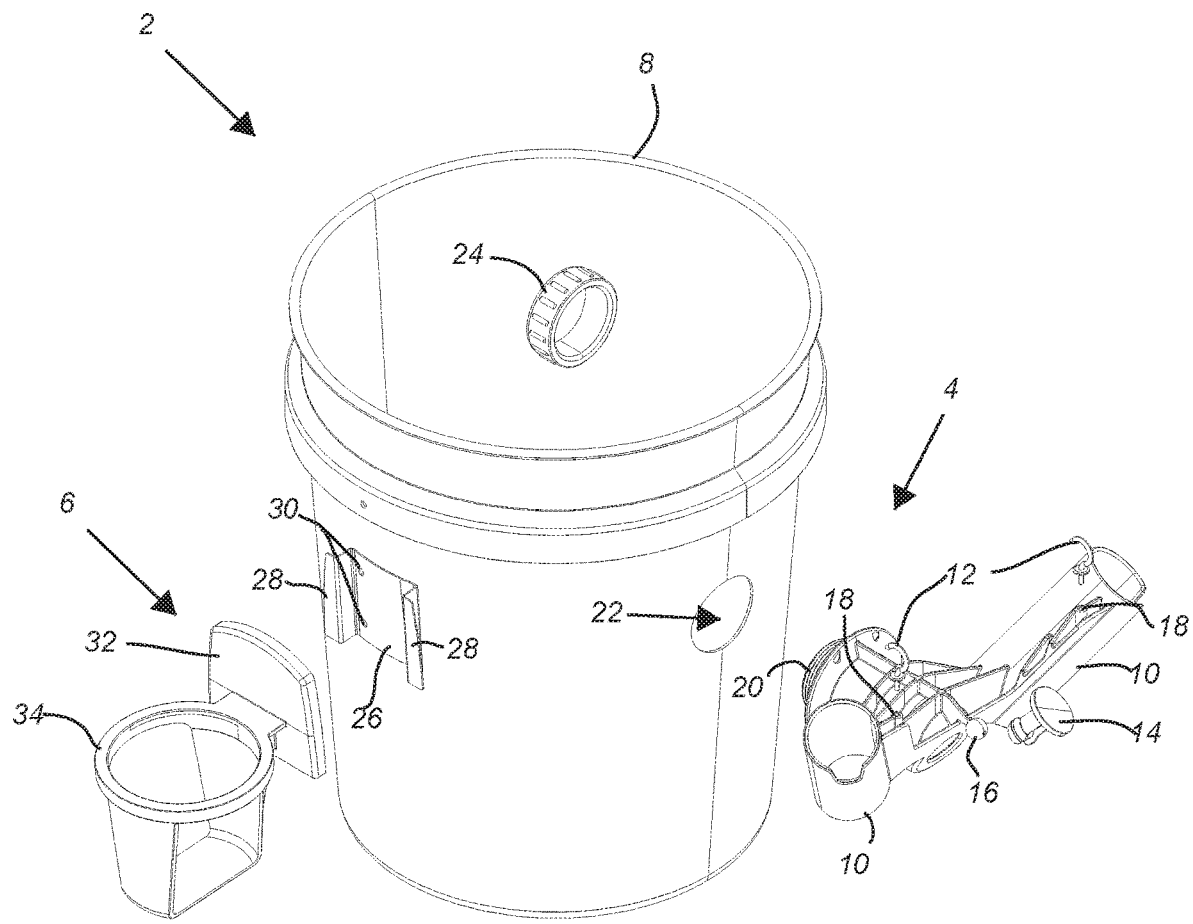
FIG. 1 is an exploded, isometric view of a preferred embodiment of the present invention
Figure 2:
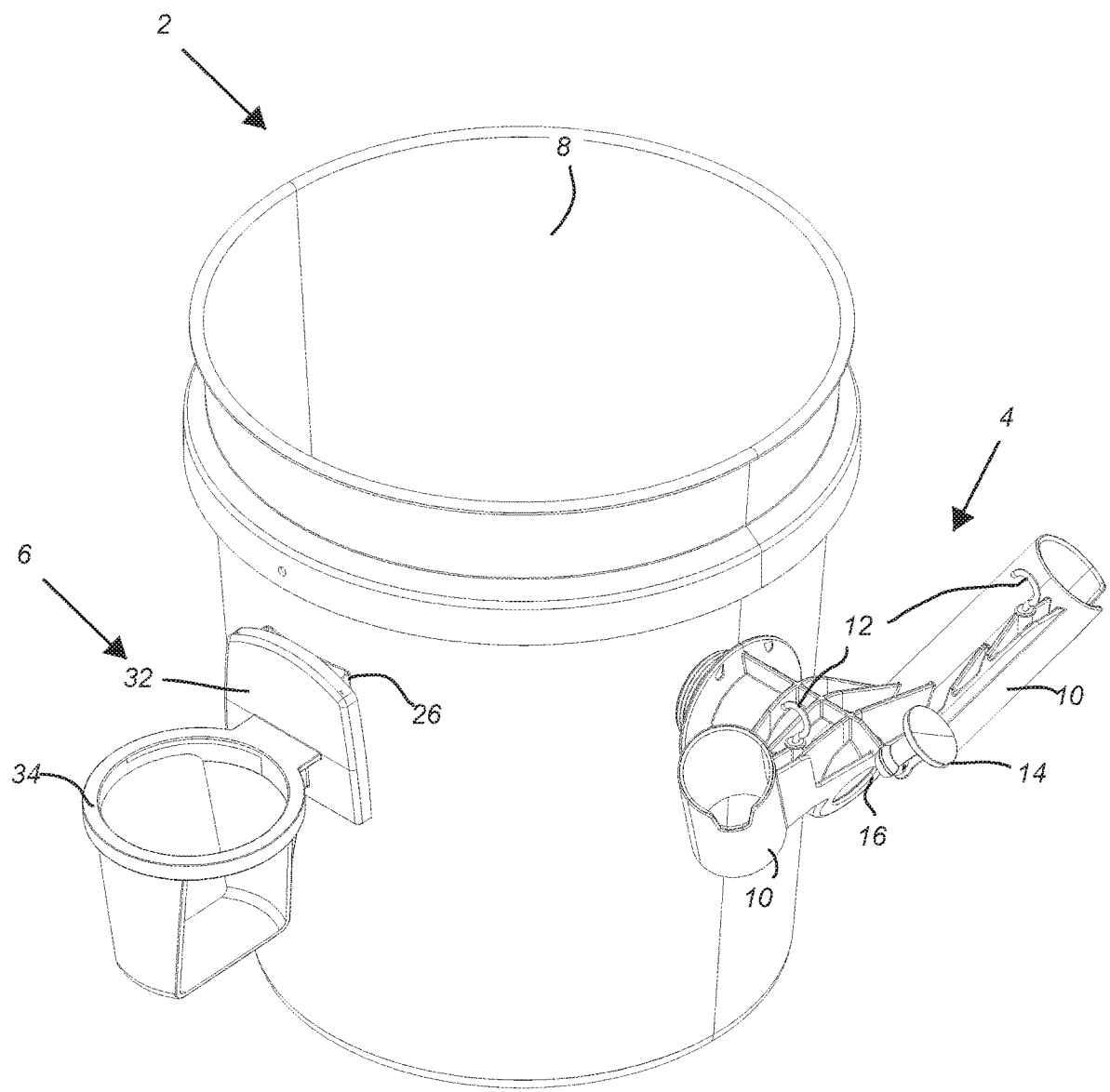
FIG. 2 is an assembled, isometric view of a preferred embodiment of the present invention.
Figure 3:
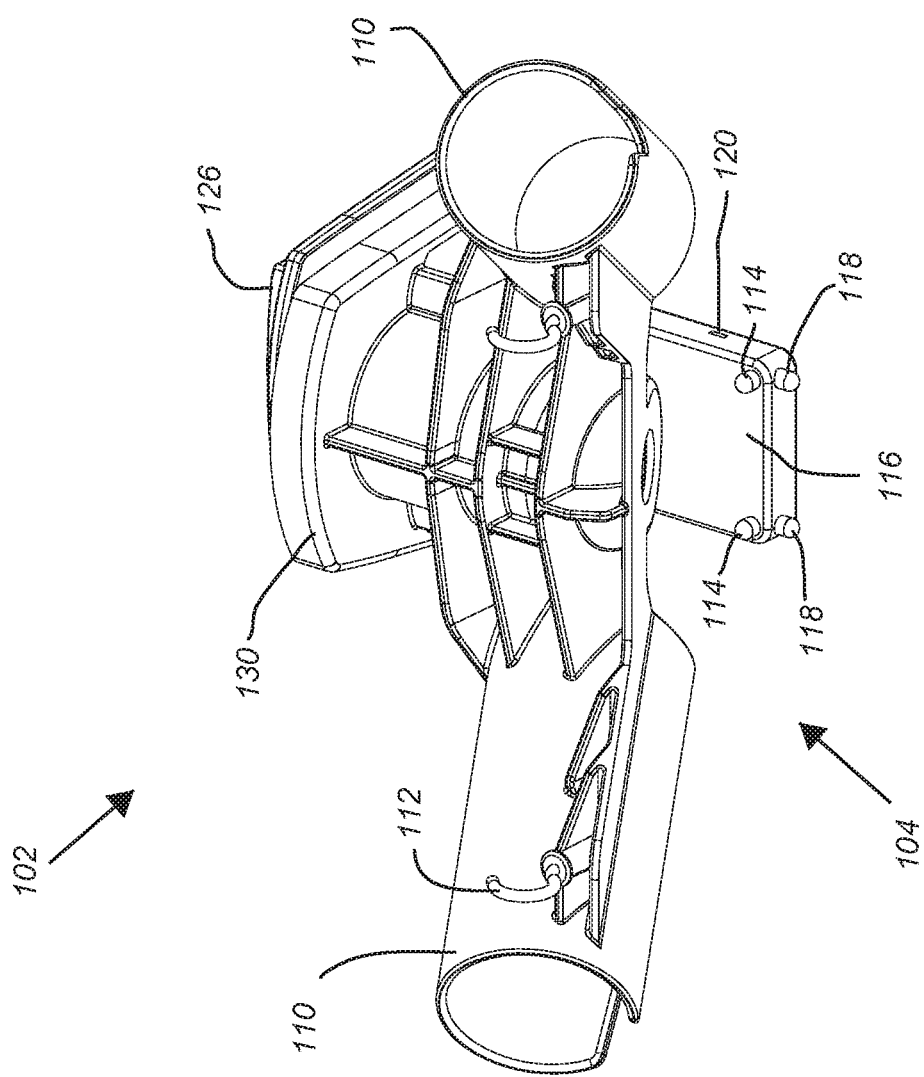
FIG. 3 is a three-dimensional isometric view of an alternative embodiment of the present invention.
Figure 4:
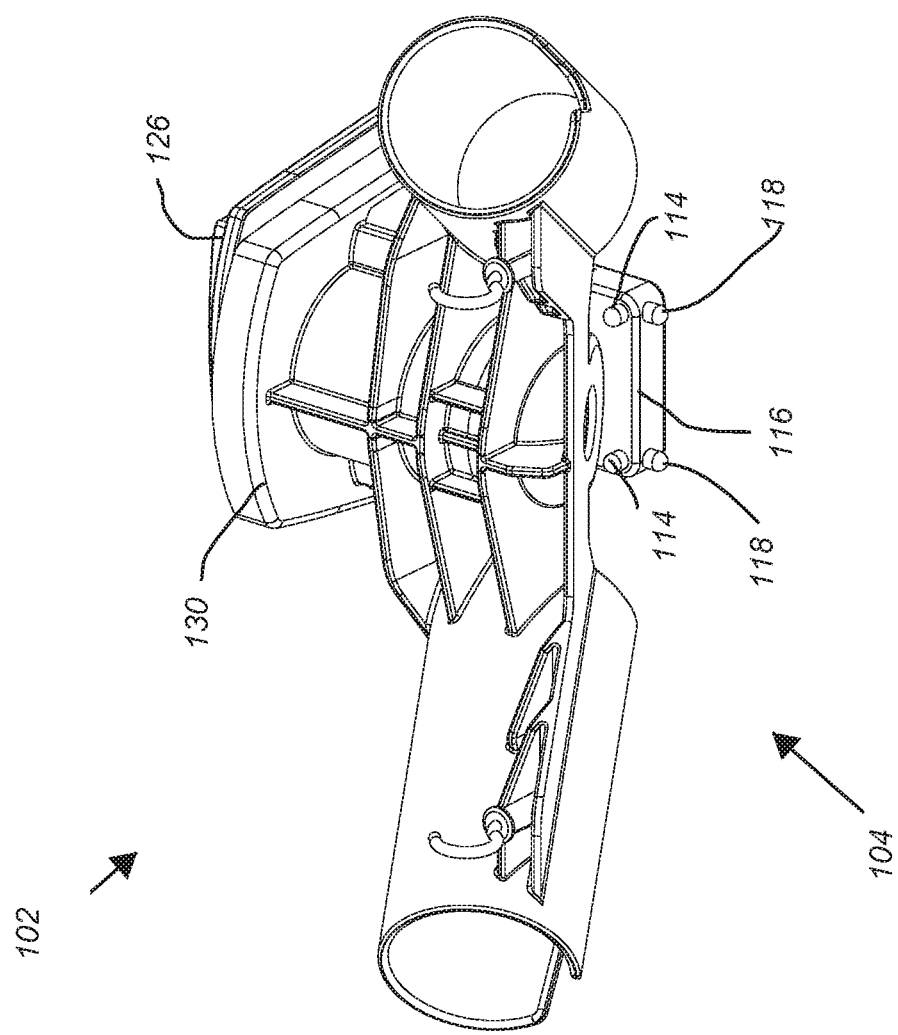
FIG. 4 is a three-dimensional isometric view thereof shown in an alternative orientation where a LED platform is tilted.
Figure 5:
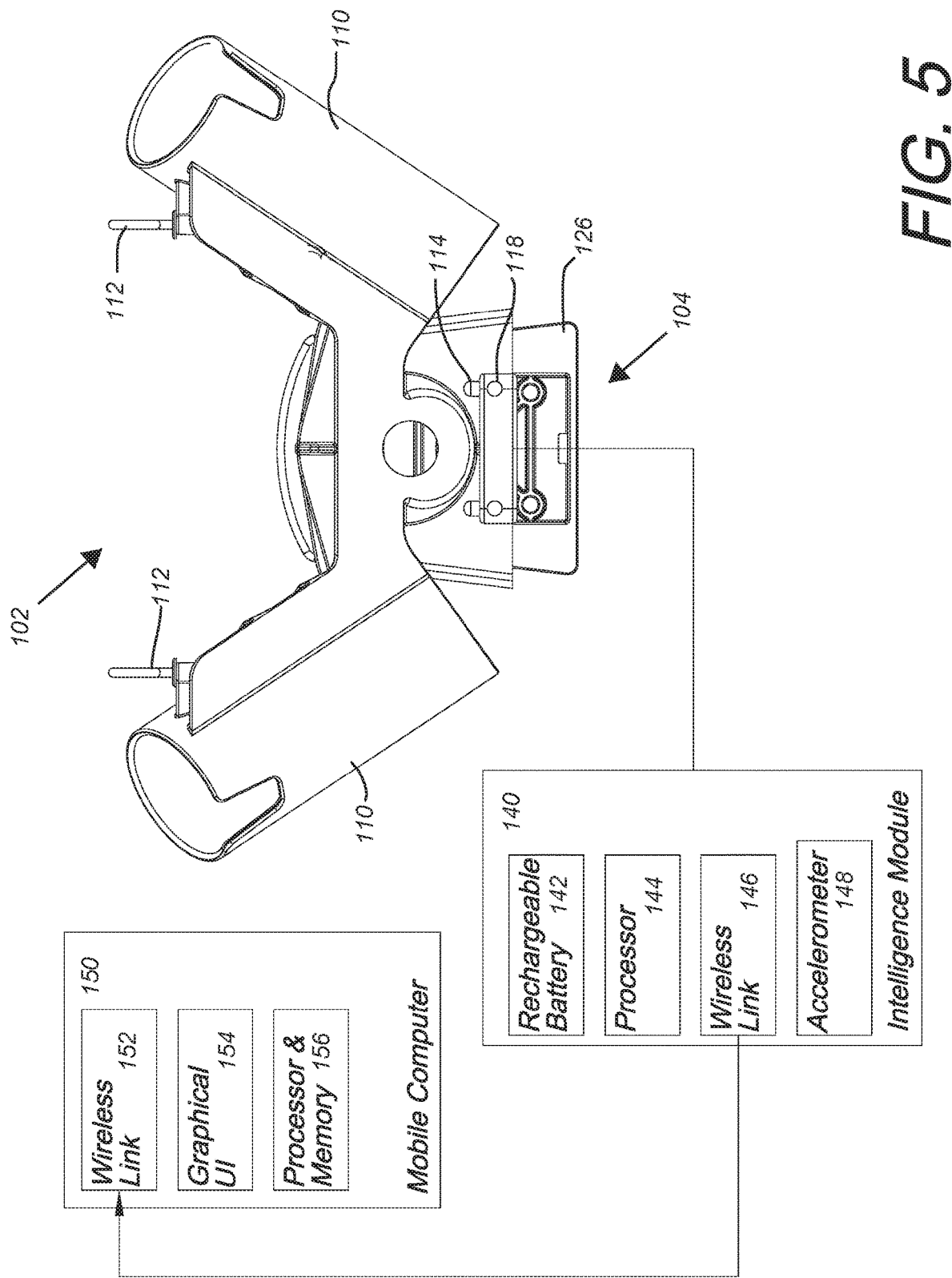
FIG. 5 is a front elevational view thereof with a diagrammatic view of elements of an embodiment of the present invention.
Figure 6:
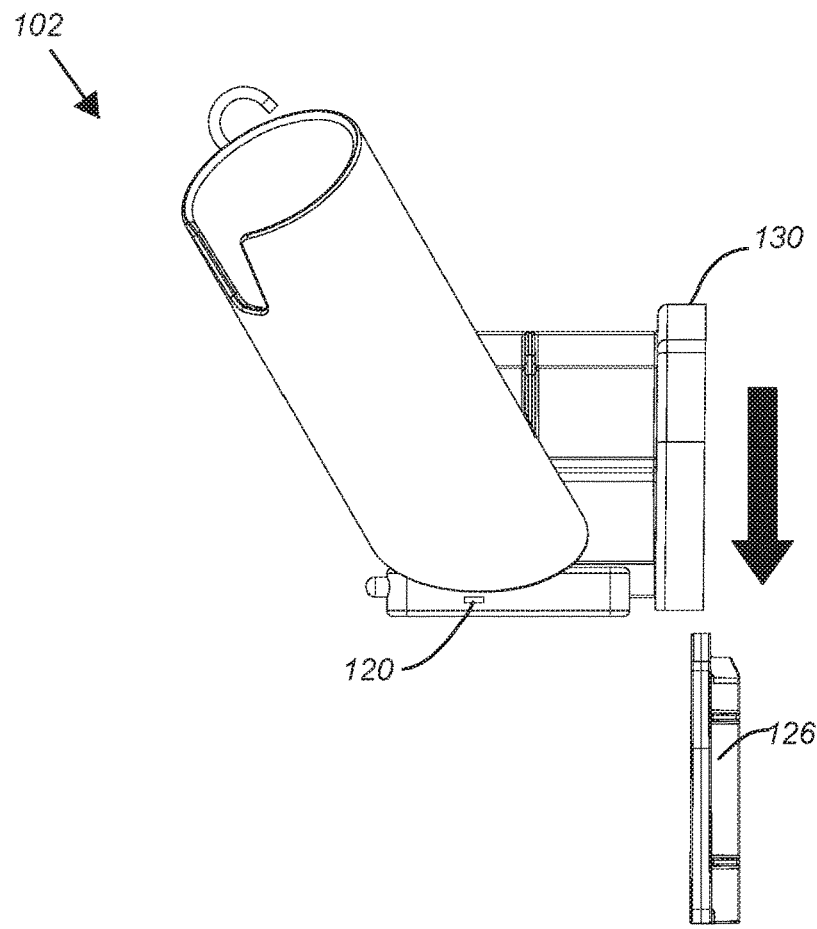
FIG. 6 is a side elevational view thereof, showing the mounting of a rod holder assembly onto a mounting receiver.
Figure 7:
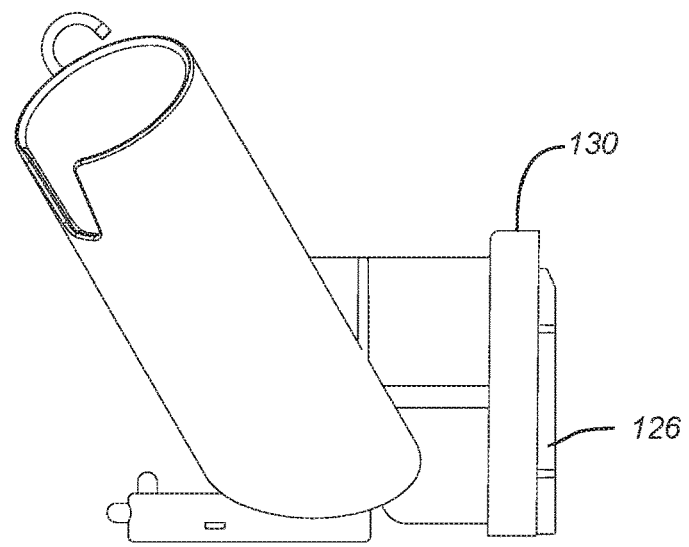
FIG. 7 is a side elevational view thereof, showing the rod holder assembly mounted to the mounting receiver.

As shown in FIGS. 1 and 2, the fishing caddy system 2 is a device that allows a fisherman to mount and monitoring his or her poles. The system 2 may include many attachments, such as a rod holder attachment 4 or an accessory attachment 6. These attachments 4, 6 can be affixed to any stationary body 8, such as a standard five gallon bucket as shown, or a tree, crate, cooler, or any other body.

As shown, the rod holder attachment 4 includes a pair of rod holder sleeves 10 angled outward away from the body 8 in which the user can place their rods.

In the middle of the device is a light emitting diode (LED) receiver 16 for an LED light 14 that allows the fisherman to see his or her lines at night and also fishing tackle in low light conditions. Additional lighting, such as a lantern, may also be attached to the body 8 or either of the attachments 4, 6.

A hook 12 is associated with each rod holder 10. These hooks receive the fishing line of a fishing rod connected to a fishing hook, thereby preventing wind from blowing the line around, resulting in missed catches. These hooks are inserted into hook receivers 18 within the rod holder assembly attachment 4.

Referring back to FIG. 1, the rod holder attachment 4 includes a screw-type connector 20 which can be screwed into the body 8 via an opening 22, such as a hole in a tree or a hole in a bucket. If the back end of the screw-type connector 20 is accessible, a locking nut 24 can be screwed onto the screw-type connector 20 to secure the attachment 4 to the body 8. The cup holder attachment 6 as shown uses an alternative attachment which is a slide receiver attachment 26 which is connected to the body 8 using mounting screws 30 or other connecting elements (e.g., nails, bolts, etc.). The slide receiver attachment 26 includes a pair of angled slides 28 which receive a corresponding receiver within a mounting plate 32 of the cup holder attachment 6 which mounts the cup holder 34. It should be pointed out that any accessory or attachment may be attached using this slide receiver attachment 26 which can function as a universal attachment. As discussed below, even a rod holder assembly 104 can be affixed to the body 8 using such a universal mounting device. FIG. 2 shows the attachments 4, 6 affixed to the body 8.

The rod holders 10 may also be individually adjustable for positioning the fishing rods.

III. Alternative Embodiment Fishing Caddy System 102

FIGS. 3-7 show an alternative fishing caddy system 102 which includes rod holder attachment 104 having a mounting interface 130 for interfacing with a universal mounting slide 126 which is functionally similar or identical to the slide receiver attachment 26 of the previous embodiment. A pair of rod holders 110 are mounted, facing out away from the body to which the universal mounting slide 126 is fastened. Alternatively, a single rod holder 110 could be used. The rod holders are preferably made of a transparent or at least translucent material capable of allowing light to pass through or illuminate the holder, thereby acting as light pipes.

As in the previous embodiment, the rod holders 110 correspond with hooks 112 for preventing the fishing line from blowing in the wind and provides fast alert to the user when fish have been caught.

An adjustable platform 116 mounted to the underside of the rod holder attachment 104 includes a pair of upward facing LEDs 114 and a pair of forward facing LEDs 118. The upward facing LEDs 114 are designed to shine through the rod holders 110, and are activated when an accelerometer 148 detects that movement has occurred due to the hooks 112 being tugged on by the line, indicating a catch. The forward facing LEDs 118 can be used to light up the water or surface around the fishing caddy system 102 and can act as a casting guide. Alternatively, the upward facing LEDs 114 could be within the rod holders 110 themselves, which would light up like a lantern if made of a translucent material. Similarly, the forward facing LEDs 118 could be lasers for providing guidelines for where to cast the fishing line.

The accelerometer 148 is part of an intelligence module 140, which also includes a rechargeable battery 142, a processor 144, and a wireless link 146, such as a Bluetooth module. The rechargeable battery 142 may be recharged using a USB interface 120 located on the adjustable platform, and may also be used in reverse to charge portable electronic devices, such as a user's smart phone or other mobile computer 150.

The user's mobile computer 150, which may be a smart phone or other mobile computing device, can wirelessly be alerted by the intelligence module using the wireless link 146 of the intelligence module 140 and a wireless link 152 of the mobile computer. This could be a wireless antenna or Bluetooth receiver module. The mobile computer also at least includes a graphical user interface (GUI) 154 and a processor and data memory 156 for storing software. Software could be incorporated into the computer memory for recording information about fish caught using the fishing caddy system 102, such as type of fish caught, size and weight of the fish, number of fish, and other notes or user inputs. This could all be incorporated into a specific software application associated with the fishing caddy or a simple text file openable by the mobile computer 150. The mobile computer can also be used to alert the user when a fish has been hooked by movement of the fishing line causing the accelerometer 148 sending an alert using the wireless link 146 of the intelligence module 140 to the wireless link 152 of the mobile computer 150, resulting in a notification on the GUI 154.

IV. Alternative Embodiment Fishing Caddy System 202

Figure 8:
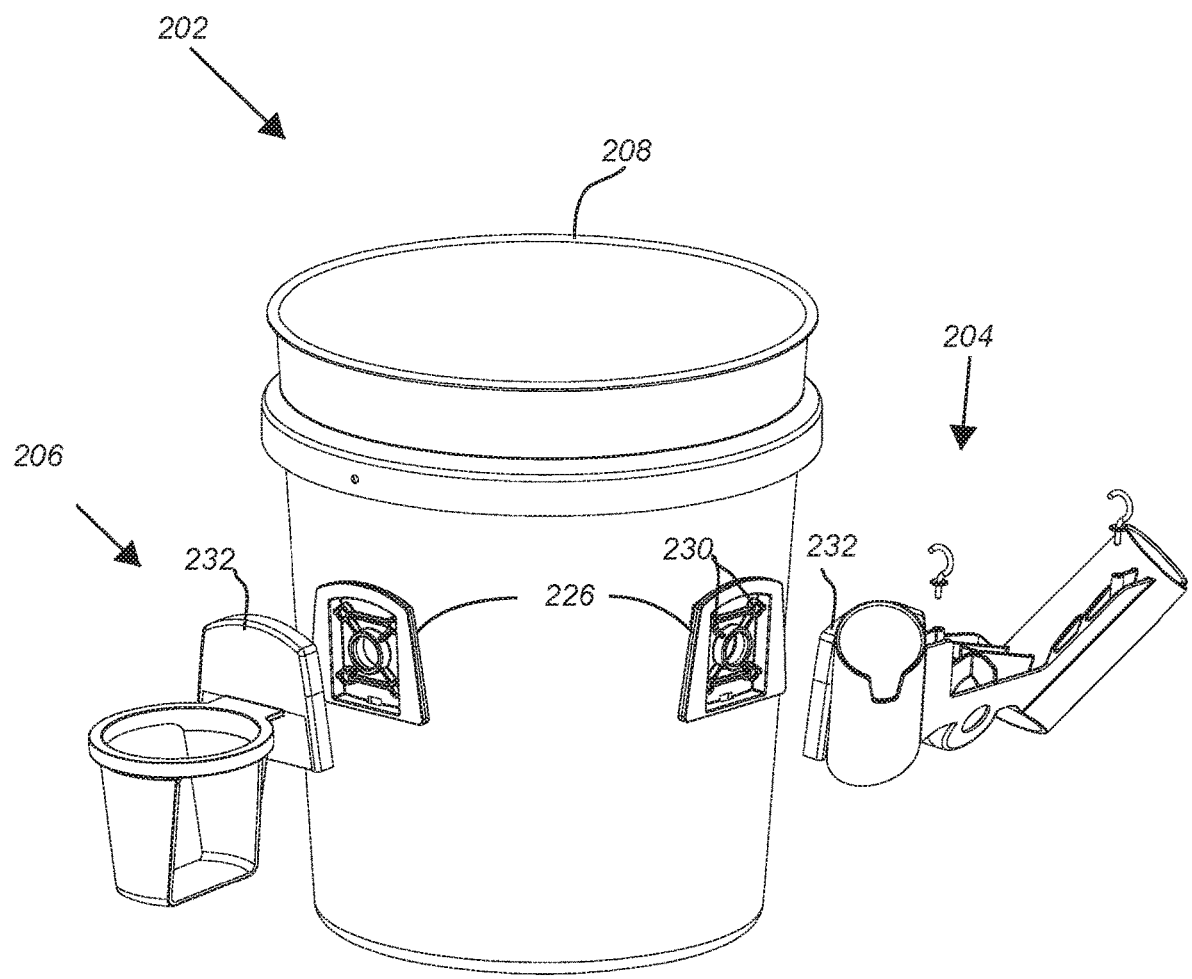
FIG. 8 is a three-dimensional isometric view of yet another alternative embodiment of the present invention.

FIG. 8 shows another slightly alternative embodiment fishing caddy system 202. Here, the body 208 may be a bucket or some other stationary body. Universal mounting receivers 226 are mounted to the body 208 via mounting holes 230 using screws, bolts, or other attaching elements. Glue could also be used. The fishing rod holder assembly 204 and cup holder assembly 206, which are identical to those discussed above, are mounted to the mounting receivers 226 using mounting interfaces 232. This allows for a universal attachment system for a fishing caddy system 202.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A method of mounting an accessory to a body, the method comprising the steps:
    affixing a mounting bracket to the body, said mounting bracket comprising a backing plate and a pair of side guide rails, each side guide rail comprising a lip extended away from said mounting bracket;
    slideably engaging the accessory to said mounting bracket via a mounting interface connected to a back end of the accessory, said mounting interface configured for mounting said accessory to said bracket;
    wherein said accessory comprises a rod holder assembly comprising a pair of rod holders, a pair of hooks each one in proximity to one of said pair of rod holders; and an adjustable LED assembly;
    wherein said pair of rod holders comprised of translucent material;
    wherein said adjustable LED assembly including a pair of upwardly oriented LEDs and a pair of forwardly oriented LEDs;
    aiming each one of said upwardly oriented LEDs at a respective one of said pair of rod holders, such that upon activation of said upwardly oriented LEDs, the corresponding rod holder illuminates;
    mounting a fishing rod into one of said pair of rod holders; and
    placing a fishing line through the one of said pair of hooks corresponding with said rod holder receiving said fishing rod.

2. The method of claim 1, further comprising a second accessory, said second accessory comprises a cup holder.

3. The method of claim 1, wherein said mounting bracket comprises a tapered shape having a shorter width along a top edge and a longer width along a bottom edge.

4. The method of claim 3, wherein:
    said pair of slides of said mounting interface comprising a tapered orientation corresponding with said tapered shape of said mounting bracket; and
    said mounting interface comprises a top edge configured to engage said top edge of said mounting bracket when said pair of slides engage said pair of side guide rails.

* * * * *